April 25, 1967  W. W. GIBSON  3,316,381

POWER SUPPLY AND METHOD FOR METAL SURFACING

Filed June 2, 1966

INVENTOR
WILLIAM W. GIBSON
BY
WARREN, BROSLER,
CYPHER & ANGLIM
ATTORNEYS

United States Patent Office 3,316,381
Patented Apr. 25, 1967

3,316,381
POWER SUPPLY AND METHOD FOR METAL SURFACING
William W. Gibson, Alameda, Calif., assignor to Glenn Pacific, a division of Teledyne, Inc., a corporation of Delaware
Filed June 2, 1966, Ser. No. 554,772
10 Claims. (Cl. 219—76)

My invention lies in the broad field of welding, but more particularly relates to that phase of the art pertaining to metal surfacing, which includes such operations as clading and hard facing, as distinguished from welding.

In welding two separate pieces are joined together by fusion, in most instances with the addition of weld rod material, resulting in a solid joint, wherein the weld rod material penetrates substantially the entire thickness of the joint and becomes fused with the base metal for effecting a solid weld.

Surfacing on the other hand, involves the deposition of weld rod material over a base metal surface to build up such surface by causing electrode wire to traverse parallel or adjacent paths over the surface of the base metal and deposit electrode metal thereon which is fused into the base metal as the electrode wire traverse such base metal. Such process is sometimes referred to as clading or hard facing, depending on the character of the surfacing material in relationship to the base material.

In surfacing, the use of weld wire of large diameter ranging up to the order of a quarter inch and more is desired, as compared to wires of smaller diameters of the order of .03 to .045 inch customarily empolyed in welding. The current requirements demanded by such electrodes and the quantities of heat developed, as well as the inability to sensitively control the same, have essentially restricted the use of large diameter wire for surfacing, to the method known in the art as spray arc welding.

The degree of penetration of the base metal, for example, may become a real problem, particularly when hard facing is involved. Under such conditions, excessive penetration not only results in large quantities of localized heat which could deleteriously affect the metallurgical characteristics of the base metal, or cause warpage or cracking of the base metal, but uncontrolled penetration could result in undue dilution of the surfacing material, which, in itself, could adversely affect the very qualities one may seek in the added surface.

Among the objects of my invention are:

(1) To provide a novel and improved surfacing power supply;

(2) To provide a novel and improved surfacing power supply which may be readily adjusted to control depth of penetration of the surfacing material into the base metal;

(3) To provide a novel and improved surfacing power supply which will enable one to lay down a surface of metal upon base metal with a controlled minimum of heat build-up;

(4) To provide a novel and improved surfacing power supply which may be readily adjusted to minimize dilution of the surfacing metal in the base metal;

(5) To provide a novel and improved surfacing power supply enabling extremely easy arc starting on the largest electrode wire, yet enable such precise control of energy as to be able to realize easy starts on smaller electrode wires without blasting;

(6) To provide a novel and improved surfacing power supply capable of fulfilling the foregoing objects, and also capable of use in welding;

(7) To provide a novel and improved surfacing power supply which derives its energy from a multi-phase alternating current supply source; and (8) To provide a novel and improved method for surfacing.

Additional objects of my invention will be brought out in the following description of a preferred embodiment of the same, taken in conjunction with the accompanying drawings wherein.

Figure 1:
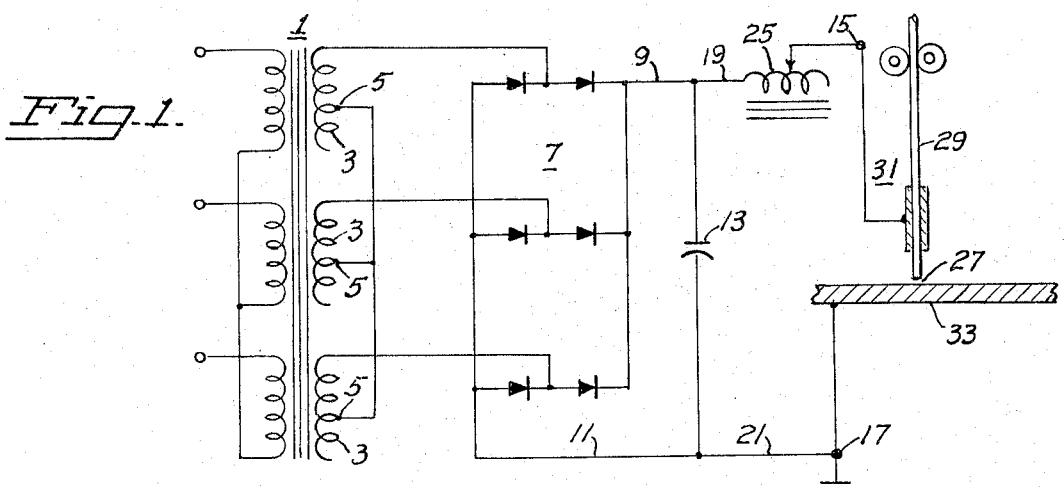
FIGURE 1 is a surfacing power supply circuit embodying the present invention in terms of a multi-phase alternating current power source.

As depicted in FIGURE 1, the surfacing power supply derives its energy from a three phase alternating current source and involves a three phase step-down transformer 1 having good regulation to minimize the inductive reactance, whereby a stable A.C. voltage across each of the secondary windings 3 of a value suitable for surfacing may be obtained. This voltage may be made adjustable within a suitable range, by a slidable contact 5 associated with each of said secondary windings.

The output from the secondary windings is rectified by rectifying means 7 in the form of a rectifier network having a pair of direct current output leads 9, 11 across which is connected capacitor means 13 preferably in the form of a capacitor bank or lumped capacity having a total value exceeding 80,000 microfarads. This capacitor means is in turn connected to a pair of load terminals 15, 17 by suitable leads 19, 21 respectively, in one of which is an inductor 25, preferably one which is adjustable in value and which may take the form of a variable inductor. In the preferred form of the invention, such inductor should have a range of zero to 5 millihenries, but may exceed such maximum value. While the capacitor means, whose value was set in excess of mfds. will run as high as 700,000 mfds. and more with the larger electrodes.

The load terminals are for connection across an arc gap 27 formed between electrode wire 29 fed by a wire feed means 31 connected to one terminal, and work 33 connected to the other terminal. Inasmuch as this portion of the circuit is direct current, one of the load terminals will be positive and the other negative, and the capacitor means 13 and variable inductor 25 will be in series with the arc gap.

As thus described, the circuit of FIGURE 1 provides constant voltage output for any voltage adjustment on the secondaries of the step-down transformer. On paper this circuit bears some similarity to the circuit shown in the patent to Glenn and Gibson for High Efficiency Auto-Modulating Welding Power Supply, No. 3,136,884 of June 9, 1964, but in actuality, distinguishes very materially over the power supply circuit of this patent, primarily in the magnitude of values employed and the unobvious results attained by reason thereof. The circuit of the patent is directed to welding wherein weld wire of small diameter of the order of .030 to .045 inch in diameter is employed, and dilution and extent of penetration of the weld wire material is not a factor.

The present invention is concerned primarily with surfacing, where the character of the surfacing metal with respect to the base metal are vital factors to be considered, as well as degree of penetration, extent of dilution, and heat developed must be taken into consideration. The use of larger diameter wire, reaching on the order of a quarter inch in diameter, becomes a practical necessity in the matter of surfacing, and such wire by comparison with that employed in welding as described in the aforementioned patent is of the order of fifty to sixty times the cross-sectional area of the smaller wire.

I have found that by vastly increasing the range of capacity in the capacity bank across the rectifier means, and providing greater range of adjustability in the inductance employed on the D.C. side of the rectifying means, a high degree of control may be realized, enabling precise control of penetration from practically zero dilution to any required depth, along with concurrent control of heat input and weld contour, all of which assumes great importance in surfacing. Also, due to the high storage of energy provided by the capacity storage means, arc starting has been found to be extremely easy on the largest wire, yet with the precise energy control permitted by the circuit, arc starting with smaller wires can also be realized and with no "blasting." Such easy arc starting is capable of being attained even when employing the power supply on short arc operation, where the electrode wire is driven at a constant speed to effect a momentary short circuit with the work to establish an arc, following which the wire is pinched off and the cycle repeated.

During such cycle of events, the condition at the arc varies from a short circuit, through various degrees of conductivity, to an open circuit condition. During the open circuit portion, the capacor means has an opportunity to charge, and at some other portion of the cycle, controllable by the adjustable inductor, the capacitor means has an opportunity to discharge, but the maximum value of discharge and duration as well as the lag angle will be a function of the adjusted value of the inductor. The excessively large capacitor storage available, enables the frequency of such discharge to be independent of the frequency of the alternating current source.

Heretofore, large diameter electrode wire, whenever previously used, was limited to spray arc procedure, but never previously employable in short arc operations. The ability to use the short arc process, places in the hands of the operator, the ability to exercise precise control over a surfacing operation.

Figure 2:
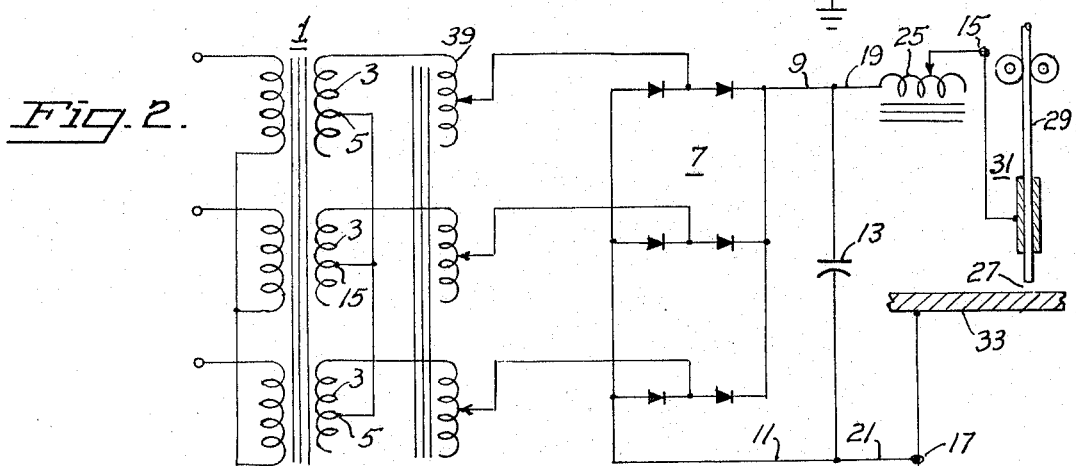
FIGURE 2 is a surfacing power supply circuit diagram based on that of FIGURE 1 but modified to include "slope control"

In the embodiment of FIGURE 2, I have introduced into each phase on the alternating current side of the rectifier means, a variable reactor 39 having a range of adjustment sufficient to drop the alternating current voltage to the rectifier means by an amount up to around 24 percent, such range of adjustment enabling an expansion of the operations attributable to the circuit of FIGURE 1.

Figure 3:
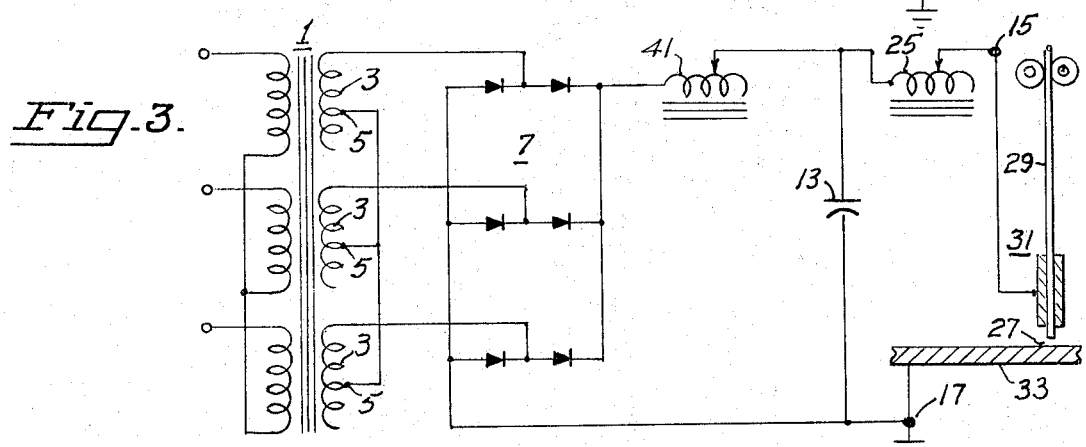
FIGURE 3 is a surfacing power supply circuit also based on that of FIGURE 1 but modified to include added control.
Figure 4:
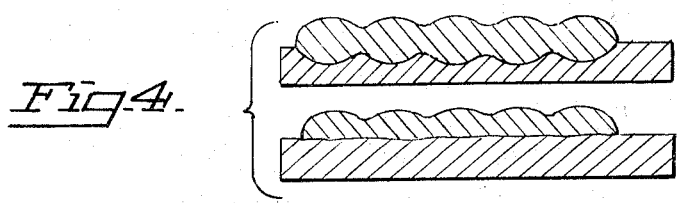
FIGURE 4 includes two comparative views in section to depict the type and range of surfacing control available with the surfacing power supply of the present invention.

The circuit of FIGURE 3, like that of FIGURE 2 is based on the circuit of FIGURE 1, but deviates therefrom by the inclusion of a variable inductor 41 in one of the connecting lines between the rectifier means 7 and the capacitor means 13 on the D.C. side of the circuit, such variable inductor having a range preferably from zero to three microhenries, and when so included in the circuit, the range of adjustment of the inductor 25 between the capacitor means and the arc gap, may be reduced somewhat to approximately the same range of adjustment.

The fact that the power supply circuits described above have been developed for surfacing operations, does not militate against the employment of the same for welding, for as previously indicated, it has been found that the magnitude of the energy involved in its operation, and the controls provided, enable extremely easy starting on both large diameter wire, as well as small diameter wire and without blasting.

This ability to extend the present invention to small diameter wire is believed attributable to the very high energy content of the capacitor bank, coupled with the control exercised by the heavier inductor, which enables one to operate on a much reduced average voltage, and achieve a hotter arc, with better wetting, and with a lack of cold laps. Also, with a lower arc voltage and shorter arc, one can carry a heavier current with out-of-position welding. The high energy discharge can furthermore, be adjusted to allow puddle turbulence which is advantageous to high strength welding.

It will be apparent from the foregoing therefore that my invention has accomplished the objects attributed thereto, and while I have illustrated and described the same in considerable detail, the invention is subject to modification and alteration without departing from the underlying principles involved, and I accordingly do not desire to be limited in my protection to the specific details illustrated and described, except as may be necessitated by the appended claims.

I claim:

1. A power supply adapted for automatic or semi-automatic surfacing and welding, comprising a source of direct current at voltage suitable for surfacing and welding; capacitor means connected in circuit across said source, and having a value exceeding 80,000 microfarads; a pair of load terminals; means connecting said capacitor means to said load terminals, said connecting means including an adjustable inductor.

2. A power supply in accordance with claim 1 characterized by said capacitor means having a value of capacity exceeding 80,000 and reaching up to the order of 700,000 mfds.

3. A power supply in accordance with claim 1 characterized by said inductor being adjustable up to five millihenries.

4. A power supply in accordance with wtih claim 1 characterized by said source of direct current voltage comprising a three phase source of alternating current and means for rectifying the same, and capacitor means being supplied by all three phases.

5. A power supply in accordance with claim 4 characterized by an adjustable reactor in circuit between said source of alternating current voltage and said rectifying means.

6. A power supply in accordance with claim 1, characterized by wire feed means electrically connected to one of said terminals, and work connected to the other of said terminals.

7. A power supply in accordance with claim 4, characterized by wire feed means electrically connected to one of said terminals, and work electrically connected to the other of said terminals.

8. A power supply in accordance with claim 4, characterized by a variable inductor in circuit between said rectifying means and said capacitor means.

9. The method of surfacing base metal with electrode wire feed apparatus comprising positioning said base metal adjacent the electrode wire to form a gap, serially connecting with said gap, capacitor means of a value exceeding 80,000 microfarads and an adjustable inductor, continually feeding electrical energy to said capacitor means, to charge said capacitor means during open circuit conditions across said gap, feeding such electrode wire toward said base metal at a rate to contact therewith and create an arc followed by a pinching off of said electrode wire to momentarily affect an open circuit, and repeating said cycle of events, traversing said base metal with said electrode wire while such cycle of events is repeated, and adjusting said adjustable inductor to control the characteristics of the resulting deposition of electrode metal on said base metal.

10. A method in accordance with claim 9, characterized by adjusting an inductor having a maximum value of inductance of the order of 5 millihenries.

References Cited by the Examiner

UNITED STATES PATENTS

| | | | |
|---|---|---|---|
| 1,972,529 | 9/1934 | Longoria | 219—135 |
| 2,255,141 | 9/1941 | Weir | 219—135 |
| 2,473,928 | 6/1949 | White | 315—243 X |
| 2,495,655 | 1/1950 | Girard | 219—135 |
| 2,936,364 | 5/1960 | Skinner | 219—135 |
| 3,025,388 | 3/1962 | Turbitt | 219—131 |
| 3,054,884 | 9/1962 | Manz et al. | 219—131 |
| 3,211,953 | 10/1965 | Gibson et al. | 219—131 X |
| 3,231,711 | 1/1966 | Gibson et al. | 219—131 |
| 3,233,076 | 2/1966 | Vilkas | 219—131 |

JOSEPH V. TRUHE, *Primary Examiner.*